Oct. 7, 1930.  L. MARSCH  1,777,928
TRACTION DEVICE
Filed Nov. 2, 1927    2 Sheets-Sheet 1
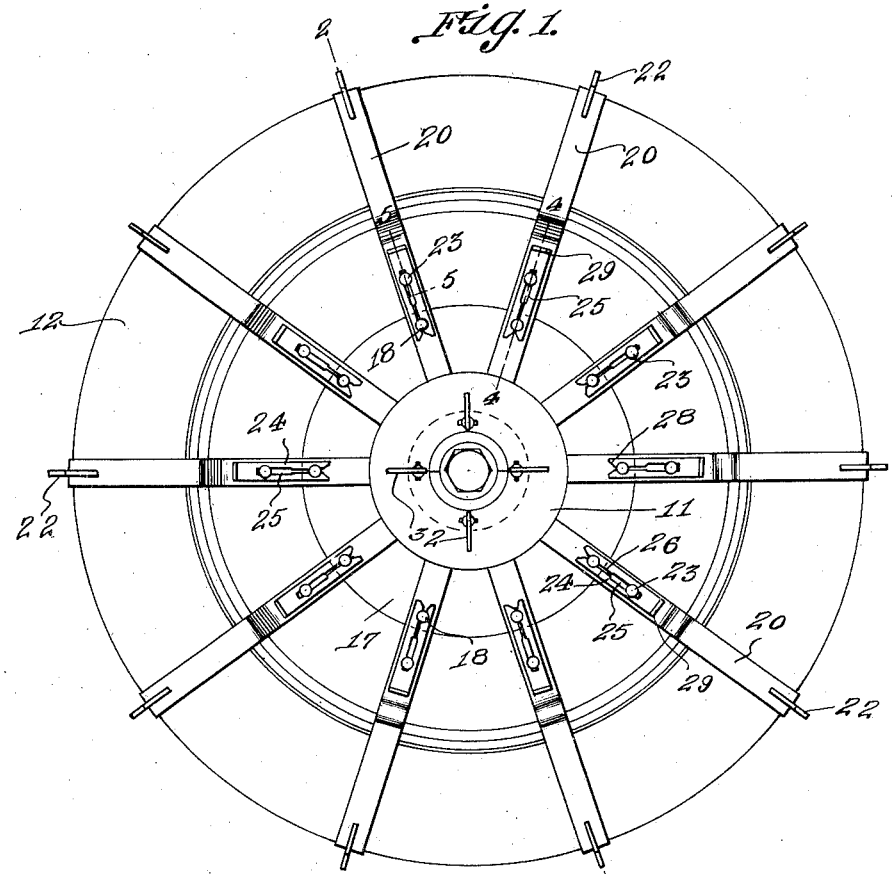
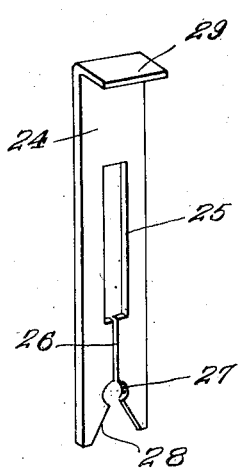
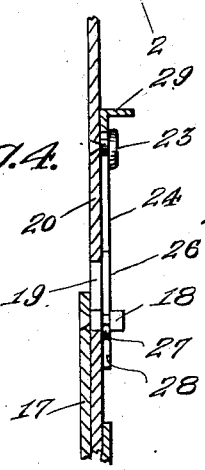
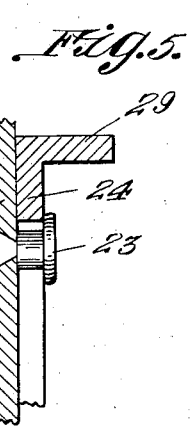
Louis Marsch, INVENTOR
BY Victor J. Evans
ATTORNEY Oct. 7, 1930.   L. MARSCH   1,777,928
TRACTION DEVICE
Filed Nov. 2, 1927   2 Sheets-Sheet 2
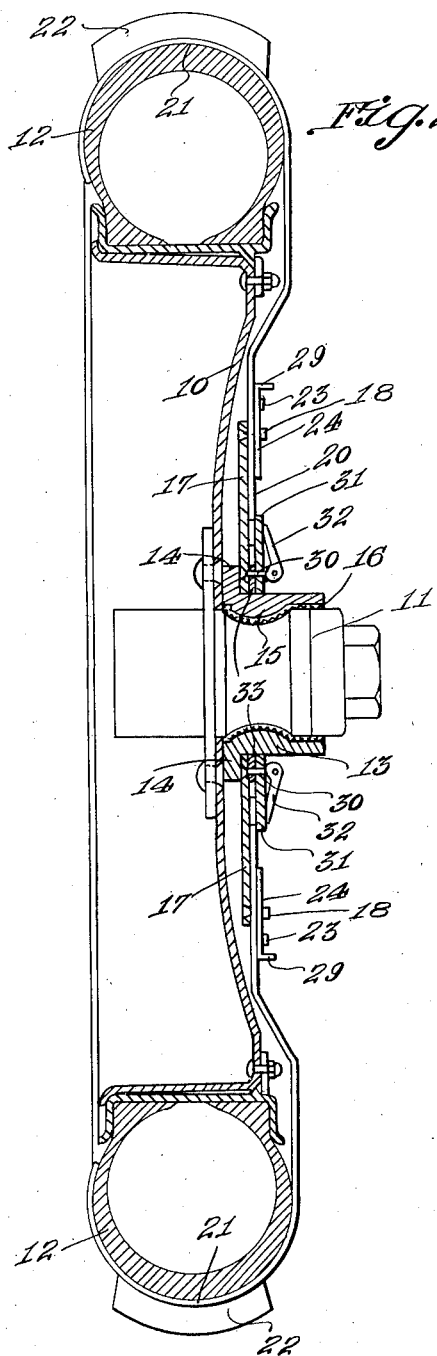
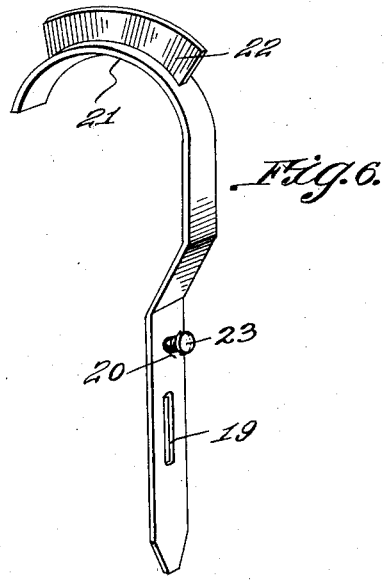
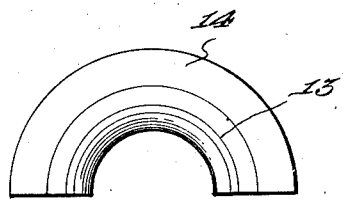
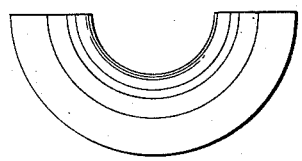
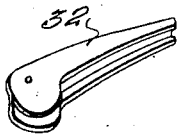
Louis Marsch, INVENTOR
BY Victor J. Evans
ATTORNEY Patented Oct. 7, 1930

1,777,928

UNITED STATES PATENT OFFICE

LOUIS MARSCH, OF MORRISONVILLE, ILLINOIS

TRACTION DEVICE

Application filed November 2, 1927. Serial No. 230,674.

This invention relates to traction devices for vehicle wheels and has for an object the provision of means of this character which may be quickly and easily applied to a wheel when required, and thereafter quickly and easily detached.

Another object of the invention is the provision of a traction device which includes a number of individual traction members, each capable of being independently secured in place, so that any desired number of these members may be employed.

Another object of the invention is the provision of means for securing these members in place in such manner as to permit of limited independent movement circumferentially of the wheel, so that wear upon the tire will be evenly distributed.

With the above and other objects in view, the invention further includes the following novel features and details of construction, to be hereinafter more fully described, illustrated in the accompanying drawings and pointed out in the appended claim.

In the drawings:—

Figure 1 is an elevation of a wheel with the invention applied.

Figure 2 is an enlarged section taken substantially on the line 2—2 of Figure 1.

Figure 3 is a detail perspective view of one of the locking plates.

Figure 4 is an enlarged fragmentary section taken substantially on the line 4—4 of Figure 1.

Figure 5 is a fragmentary section on the line 5—5 of Figure 1, the view being upon a much larger scale.

Figure 6 is a detail perspective view of one of the traction members.

Figure 7 is an elevation of the sectional bearing sleeve showing the sections separated.

Figure 8 is a detail perspective view of one of the cam levers.

Referring to the drawings in detail wherein like characters of reference denote corresponding parts, the reference character 10 indicates a wheel which is shown as of the disk type, although the invention is capable of use with other types of wheels. The hub of the wheel is indicated at 11 and the tire at 12 and while a pneumatic tire is shown, the invention is equally well adapted for use with any other kind of tire.

Mounted upon the hub 11 of the wheel is a bearing disk which is formed of separate semi-circular sections 13, each of which is provided with a flange 14, so that when the sections 13 are in position upon the hub 11 the bearing will carry at its inner end an annular flange. The bore of the bearing may be of the same diameter throughout or it may be provided with an annular rib 15 receivable within an annular groove provided in the hub. It is preferred to provide the bearing with a suitable lining 16 to protect the hub.

Positioned upon the hub against the flange 14 is a disk 17 from which extends headed pins 18. These pins are adapted for passage through elongated slots 19 provided in arms 20 which are adapted to be disposed radially of the wheel. Any number of these pins and arms may be employed, ten being shown. The arms 20 extend outward and terminate in substantially semi-circular portions 21 which extend over the tread of the tire 12 and these portions have extending therefrom ribs 22 which will be disposed transversely of the tire.

Mounted upon headed studs 23 which extend from each of the arms 20 is a locking plate 24 and these plates are provided with elongated slots 25 so that they may be moved longitudinally of the arms 20. The inner ends of the plates 24 are longitudinally slitted as at 26 and their extremities are provided with recesses 27 having outwardly flared walls 28. The outer ends of the plates 24 are provided with right angular extensions 29. By moving the plates 24 longitudinally, their inner ends may be engaged with the studs 18, the plates being formed of resilient metal so that their inner bifurcated ends may swing apart when forced over the studs and yieldingly hold the plates in position. The arms 20 will thus be securely locked to the disk 17 in a manner to permit of limited independent movement of the arms.

Extending from the disk 17 are pins 30 which pass through openings provided in a relatively small disk 31, while pivotally secured to the outer ends of the pins 30 are cam levers 32. The disk 31 is of sufficient diameter to overlap the inner ends of the arms 20 and a spacing ring 33 is interposed between the disks 17 and 31. This ring is of substantially the same thickness as the thickness of the arms 20 so that the disk 31 will not bind upon these arms.

Any necessary number of the traction elements described may be placed upon the wheel without jacking up the wheel. In use, the particular traction element engaging the ground will have limited circumferential movement on the tire. This movement is limited by engagement with the tire of the hook or hooks diametrically opposite the ground engaging hook. The disk 17 has slight rotary movement upon the hub 11 due to the movement of the ground engaging traction element, so that as each traction element performs its function, it will be given a slight movement circumferentially of the tire and wear upon the latter will be thus evenly distributed.

The invention is susceptible of various changes in its form, proportions and minor details of construction and the right is herein reserved to make such changes as properly fall within the scope of the appended claim.

Having described the invention what is claimed is:—

A traction device for vehicle wheels comprising a plurality of arms adapted to extend radially of the wheel, means rotatably mounted on the hub and slidingly engaging the inner ends of the arms, traction devices carried by the outer ends of the arms and adapted to engage over the tread of the tire of a wheel, headed studs carried by the rotatable means, said arms having longitudinal slots therein to receive the studs and provide a sliding pivotal connection between the arms and rotatable means, and means detachably engaging the studs to prevent accidental disengagement of the arms and rotatable means.

In testimony whereof I affix my signature.

LOUIS MARSCH.